United States Patent

Höck

[11] Patent Number: 5,314,039
[45] Date of Patent: May 24, 1994

[54] DRIVE ASSEMBLY FOR A FOUR WHEEL DRIVE VEHICLE, HAVING A DISCONNECTABLE VISCOUS COUPLING

[75] Inventor: Michael Höck, Brühl, Fed. Rep. of Germany

[73] Assignee: Viscodrive GmbH, Lohmar, Fed. Rep. of Germany

[21] Appl. No.: 994,925

[22] Filed: Dec. 22, 1992

Related U.S. Application Data

[63] Continuation of Ser. No. 602,188, Oct. 22, 1990, Pat. No. 5,174,408.

[30] Foreign Application Priority Data

Oct. 20, 1989 [DE] Fed. Rep. of Germany ....... 3934913

[51] Int. Cl.⁵ .......................................... B60K 17/346
[52] U.S. Cl. ...................................... 180/248; 180/249; 192/35; 192/48.8; 192/48.92; 192/58 B
[58] Field of Search ................... 180/248, 249, 233; 192/35, 48.8, 48.92, 58 B; 475/87

[56] References Cited

U.S. PATENT DOCUMENTS

| | | | |
|---|---|---|---|
| 4,848,507 | 7/1989 | Masuda et al. | 180/248 |
| 4,966,265 | 10/1990 | Wiese et al. | 192/35 |
| 4,982,808 | 1/1991 | Taureg et al. | 180/233 |
| 5,056,640 | 10/1991 | Yamamoto | 180/248 |
| 5,174,408 | 12/1992 | Hock | 180/248 |

FOREIGN PATENT DOCUMENTS

3317247 11/1984 Fed. Rep. of Germany .
3708193 10/1987 Fed. Rep. of Germany .

Primary Examiner—Mitchell J. Hill
Attorney, Agent, or Firm—Harness, Dickey & Pierce

[57] ABSTRACT

A drive assembly for a four wheel drive vehicle, which drive assembly, during forward driving, automatically assumes a freewheeling position if the speed of the dependent wheel axle is higher than that of the permanently driven axle, with the four wheel drive function otherwise being maintained with a reduced driving torque, even during reversing, the drive assembly providing the freewheeling unit with a second viscous coupling which is connected in parallel and whose torque transmitting capacity is smaller than, or equal to, that of the first viscous coupling.

1 Claim, 6 Drawing Sheets

DRIVE ASSEMBLY FOR A FOUR WHEEL DRIVE VEHICLE, HAVING A DISCONNECTABLE VISCOUS COUPLING

This is a continuation of U.S. patent application Ser. No. 602,188, filed Oct. 22, 1990 now U.S. Pat. No. 5,174,408 issued Oct. 29, 1992.

BACKGROUND OF THE INVENTION

The invention relates to drive assembly for a four wheel drive vehicle in the case of which the wheels of the front axle are driven permanently and the wheels of the rear axle are driven by a viscous coupling arranged in the longitudinal driveline. A freewheeling unit is connected in series with the viscous coupling and, during forward driving, permits the rear wheels to rotate faster than the front wheels.

From U.S. Pat. No. 3,760,922 it is known to provide drive assemblies with viscous couplings having at least two sets of plates with one set each being associated with a coupling hub and a coupling housing. The remaining space between the alternately arranged set of plates is partially filled with a viscous fluid, e.g. silicone oil.

In the case of drive assemblies for four wheel drive vehicles provided with viscous couplings, it is temporarily necessary to disconnect the rear axle from the engine drive, for example when operating the vehicle brake in order to maintain the stability of the vehicle.

From DE 33 17 247 A1 it is known, for example, to provide the rear axle with a torque derived from the front axle differential of a vehicle permanently driven via the front wheel axle. A viscous coupling is incorporated into the longitudinal driveline of such a vehicle, so that if a speed differential between the two wheel axles occurs, an increasing driving torque is transmitted to the rear wheels. A speed differential between the two axles occurs of necessity for example if the permanently driven front wheels are subject to a higher degree of slip. As a result, an additional torque builds up for the rear axle because the speed differential between the two axles causes a relative movement of the sets of plates relative to each other, with the viscous fluid in the coupling housing being sheared. Under normal driving conditions this effect is desirable.

However, the disadvantage of this design of a viscous coupling in the driveline is that independently of how the speed differential occurs, the viscous coupling changes into the torque transmitting condition as soon as a speed differential occurs. If the vehicle is braked, the shearing effect of the viscous fluid also causes a braking moment to be transmitted to the rear axle via the viscous coupling, so that an increased slip occurs at the rear axle, with the vehicle losing its lateral stability. Even with vehicles with an anti-locking device, this disadvantage is particularly noticeable.

To avoid such a critical driving condition, it is known to design the viscous coupling in such a way that, if necessary, it may be disconnected via a switching assembly. If the rear axle is subject to a higher speed than the front axle, the switching assembly acts like a freewheeling unit and prevents the occurrence of such critical driving conditions when the front axle is overbraked or the vehicle is subject to a load change.

For this reason, the patent specification already mentioned proposes a permanently effective freewheeling unit with a freewheeling torque being transmitted from the front axle to the rear axle during forward driving. During reversing under four wheel drive conditions, the freewheeling unit is blocked manually or automatically, for example by engaging the reverse gear. The disadvantage of this design refers to the mechanical blocking of the freewheeling unit between the front and rear axle during reversing. Furthermore, it is necessary to provide a switching device for operating the freewheeling lock, which renders the production of such a drive assembly more expensive.

From DE 37 08 193 A1 it is known to provide a permanently ineffective freewheeling device with a freewheeling lock which, when operating the vehicle brake, automatically unlocks the freewheeling lock and switches the freewheeling unit into an operative condition. However, the disadvantage of this design are that the freewheeling device can only be switched via the vehicle brake and that the rear axle cannot be disconnected when changing to a traction mode of operation.

SUMMARY OF THE INVENTION

Accordingly, it is an object of the present invention to provide a drive assembly which during forward driving automatically assumes a freewheeling position if the speed of the dependent wheel axle is higher than that of the permanently driven wheel axle and which, otherwise, retains the function of a four wheel drive with a reduced driving torque even during reversing.

Pursuant to this object, and others which will become apparent hereafter, one aspect of the present invention resides in a second viscous coupling connected in parallel with the freewheeling unit, whose torque transmitting capacity is smaller than, or equal to, that of the first viscous coupling.

During forward driving the braking torque acts on the rear axle via the second viscous coupling and during reversing torque is transmitted via the two viscous couplings connected in series.

By providing a smaller torque transmitting capacity, blocking of the rear wheels via the front wheels is prevented.

According to a further embodiment of the invention, the second viscous coupling has a hump effect. Because the second viscous coupling has a hump effect, a further reduction in torque is avoided.

According to yet another embodiment of the invention, the output end of the freewheeling unit is nonrotatingly connected to the output end of the second viscous coupling. In the case of this design, driving is effected via the transmitting connection between the first viscous coupling and the freewheeling unit during forward driving, with the second viscous coupling, initially, not having any function because the two sets of plates have the same speed.

When the axle which is not permanently driving exhibits a higher speed, the freewheeling unit is activated automatically, thereby permitting overtaking. In this case, the existing transmitting connection between the two viscous couplings connected in series has a braking effect on the dependent wheel axle. If the direction of rotation is reversed, torque is transmitted via the two viscous couplings connected in series.

In a further embodiment of the invention, the two viscous couplings, together with the freewheeling unit, are accommodated in a housing.

By associating the two sets of plates with the freewheeling unit it is possible to achieve a particularly advantageous drive assembly design requiring no more than the smallest possible space in the vehicle.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
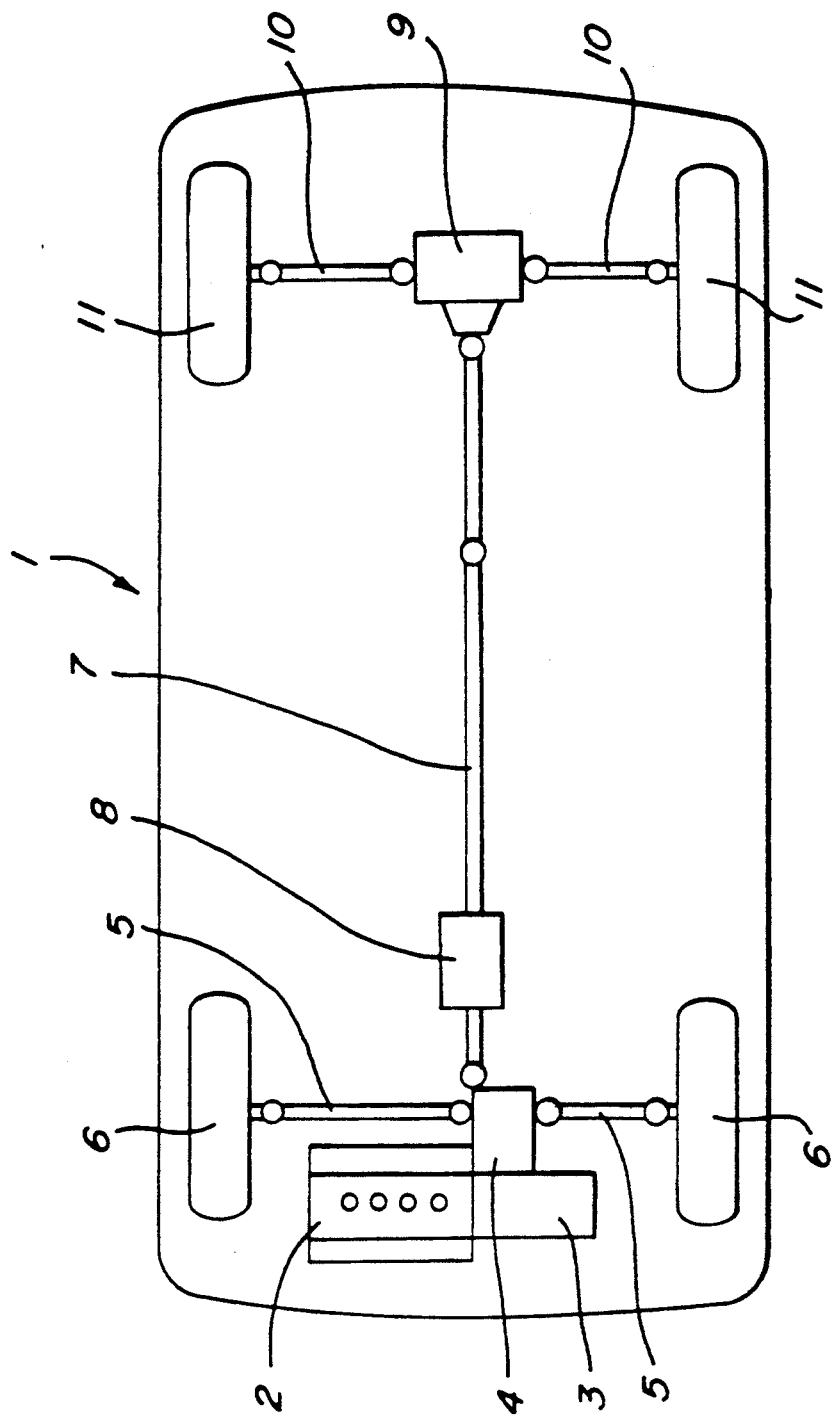
FIG. 1 shows a four wheel drive vehicle having a drive assembly for the rear axle pursuant to the present invention.
Figure 2:
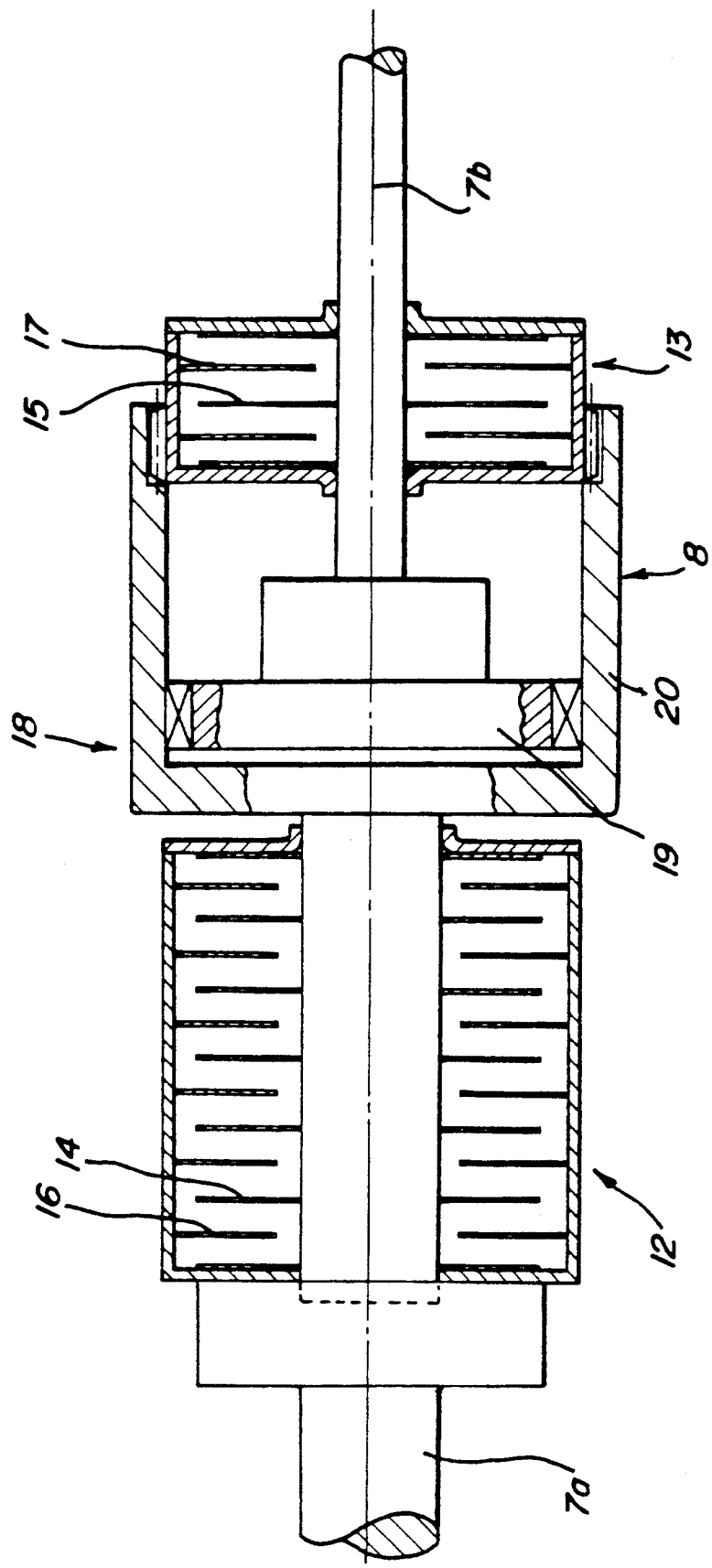
FIG. 2 shows a diagrammatic view of a drive assembly for a propeller shaft for transmitting torque to the rear axle.

FIG. 1 shows a four wheel drive motor vehicle 1 whose engine 2, via a manual gearbox 3 and a front axle differential 4 and front halfshafts 5 is connected to driven front wheels 6. In addition, the drive for the rear axle is branched off the front axle differential 4 via a propeller shaft 7. The propeller shaft 7 includes a drive assembly 8 which, via a rear differential drive 9 and halfshafts 10, is connected to the rear wheels 11.

FIGS. 2 through 5 show the operating principle of the drive assembly 8 having a first viscous coupling 12 associated with the input end and a second viscous coupling 13 associated with the output end of the propeller shaft 7. Both viscous couplings 12, 13 comprise inner plates 14, 15 and outer plates 16, 17 and are connected to each other via a freewheeling unit 18. The freewheeling unit 18 consists of an inner ring 19 and an outer ring 20, with the outer plates 16 of the first viscous coupling 12 being connected directly to the propeller shaft 7 and with the inner plates 14 being connected to the outer ring 20 of the freewheeling unit 18 and, via the freewheeling unit 18, to the outer plates 17 of the second viscous coupling 13. The inner ring 19 of the freewheeling unit 18 is connected directly to the inner plates 15 of the second viscous coupling 13.

Figure 3:
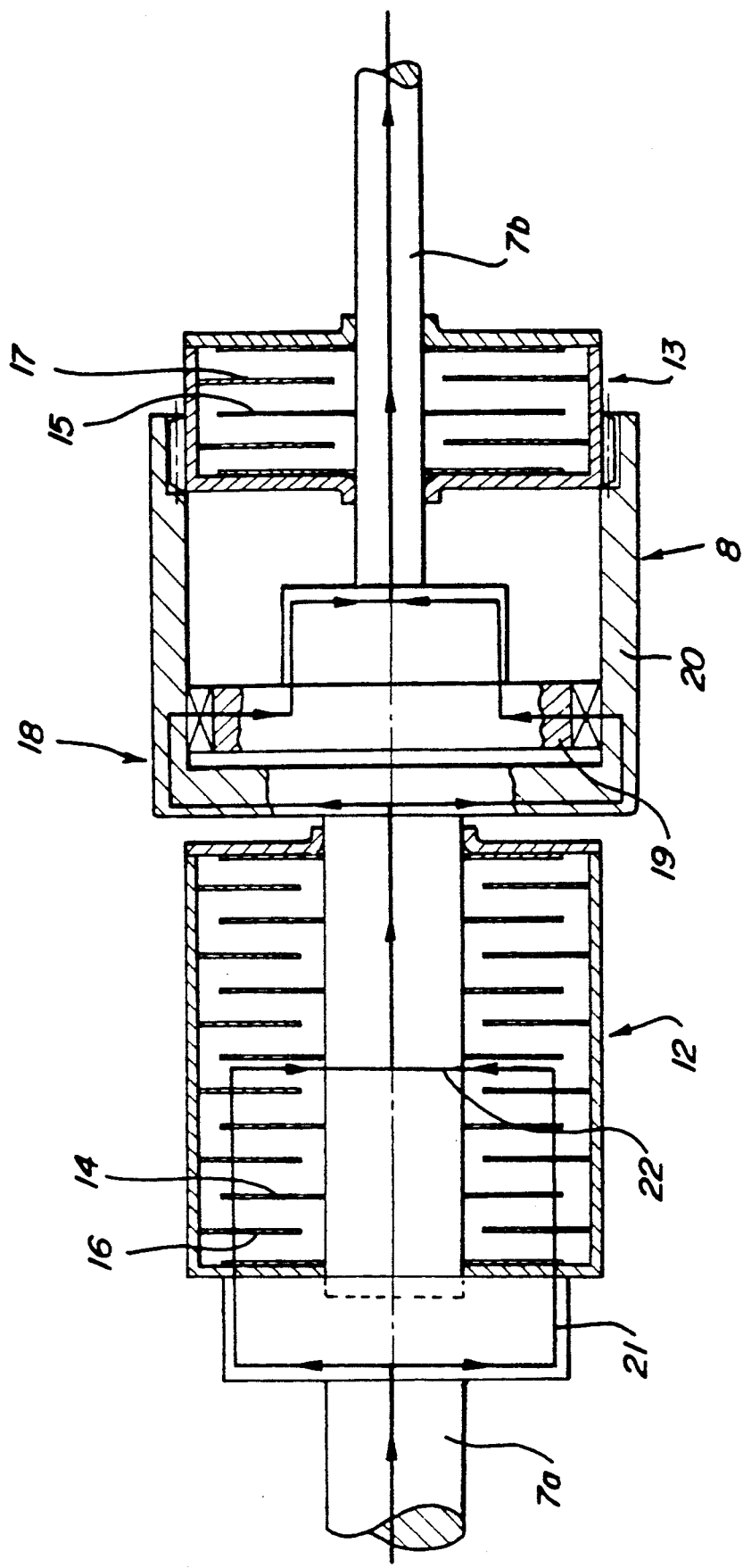
FIG. 3 is a drive assembly according to FIG. 2 with a marked transmitting function in the forward direction.

A line 21 in FIG. 3 indicates the function of the drive assembly 8 during forward driving. The outer plates 16 of the first viscous coupling 12 which are firmly connected to the propeller shaft 7, as a result of the shear effect of the viscous fluid, move the inner plates 14 and drive the outer ring 20 of the freewheeling unit 18. Via a lock 25 not explained in greater detail, the outer ring 20 transmits the torque onto the inner ring 19, with the lock 25 in an engaged position, which, in turn, is directly connected to the output end of the propeller shaft 7. Because the vehicle 1 is accelerated in the forward direction, a slip occurs at the front wheels 6, and the speed differential between the front wheels 6 and the rear wheels 7 causes a torque in the first viscous coupling 12 as a result of the shear effect of the viscous fluid. Because the outer ring 20 of the freewheeling unit 18 is non-rotatingly connected to the inner ring 19, torque is transmitted directly to the rear wheels 11. The second viscous coupling 13, in this case, has no function because the inner and outer plates 15, 17 have the same speed.

Under these normal driving conditions, and taking into account the characteristics of the first viscous coupling, the vehicle operates under four wheel drive conditions, moving at an accelerated or uniform speed.

Figure 4:
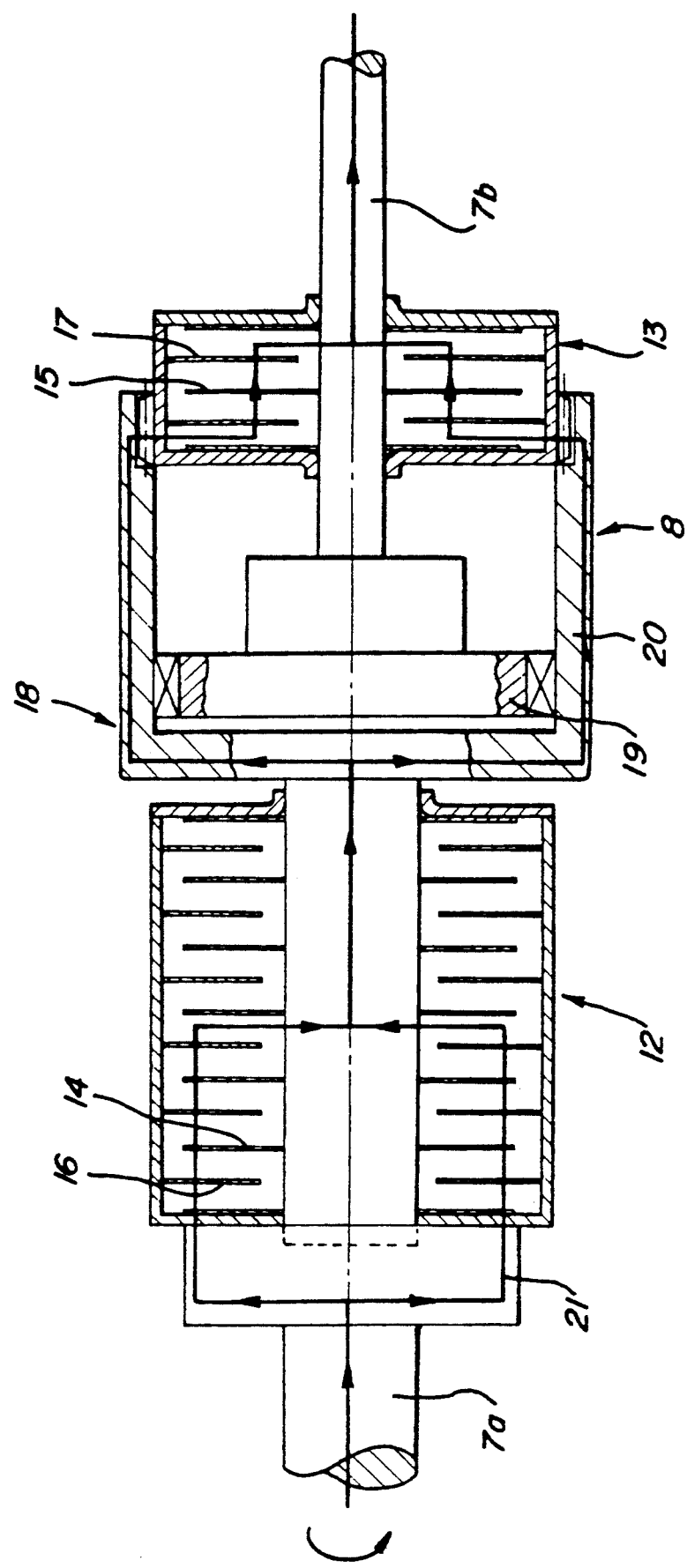
FIG. 4 is a drive assembly according to FIG. 2 with a marked transmitting function during braking and in the case of a load change.

The line 21 in FIG. 4 indicates the function of the drive assembly 8 in the case of a load change and when braking during forward driving. If the speed of the front wheels 6 is lower than that of the rear wheels 11, the input end is driven by the propeller shaft 7 only via the inner plates 15 and the outer plates 17 of the second viscous coupling 13. The freewheeling unit 18, in this case, is disengaged and there is no connection between the outer ring 20 and the inner ring 19 since the lock is disengaged. Under these delayed operating conditions due to the fuel supply being throttled or with the vehicle brake being operated, an additional braking effect is exerted on the rear axle 11 by the connected engine 2 with the manual gearbox 3 via the second viscous coupling 13 so that four wheel drive conditions remain effective. Because of the smaller capacity of the second viscous coupling 13, locking of the rear wheels is impossible and as a result of the lateral guidance and traction forces of the rear wheels 11 the stability of the vehicle remains completely unchanged.

Figure 5:
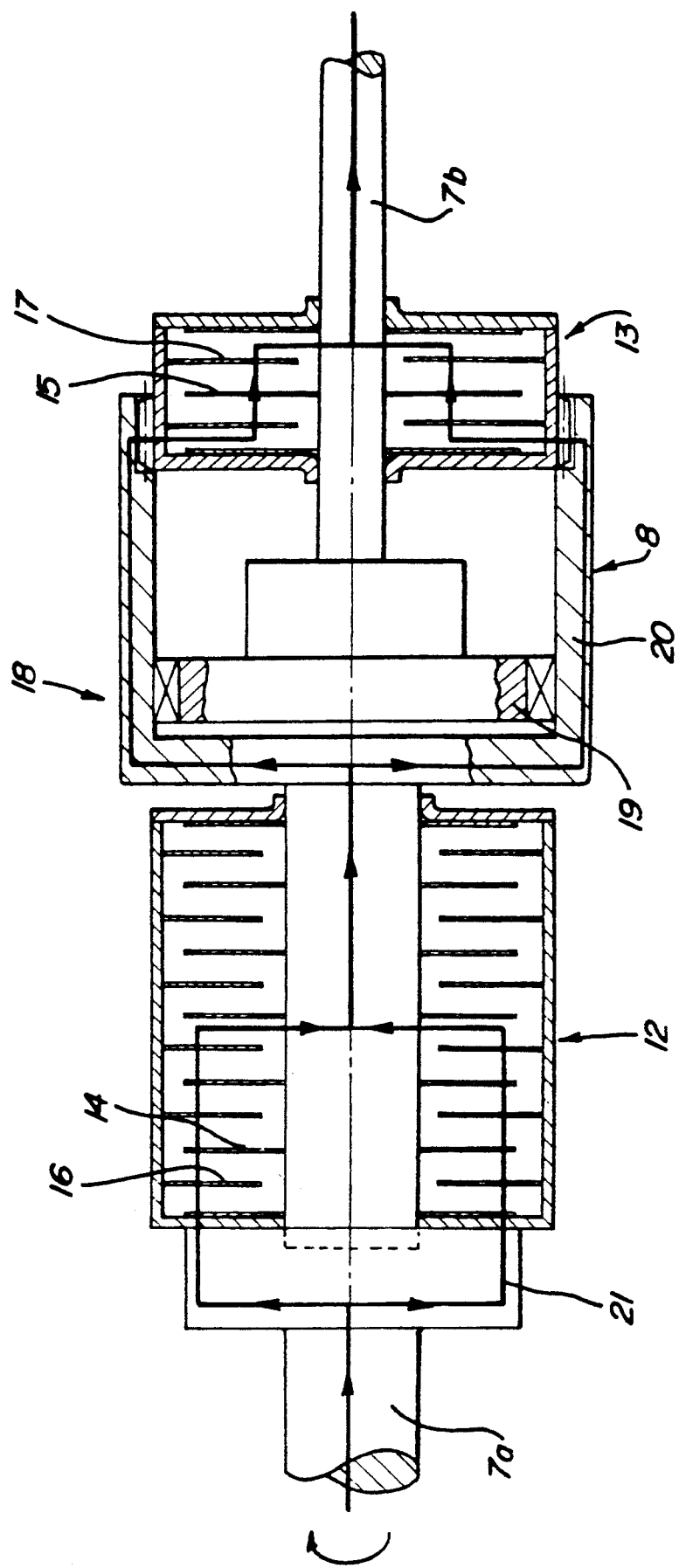
FIG. 5 is a drive assembly according to FIG. 2 with a marked transmitting function during reversing.

The line 21 in FIG. 5 indicates the function of the drive assembly 8 during reversing. In this case, the direction of rotation of the propeller shaft 7 is reversed and the freewheeling unit is not blocked, with the speed of the front wheels 6 being higher than that of the rear wheels 11. The torque is transmitted from the first viscous coupling 12 via the outer ring 20 of the freewheeling unit 18 to the second viscous coupling 13 and thus to the output end of the propeller shaft 7. Because of the smaller capacity of the viscous coupling 13, the entire torque is not available. However, even during reversing the four wheel drive function is maintained.

Figure 6:
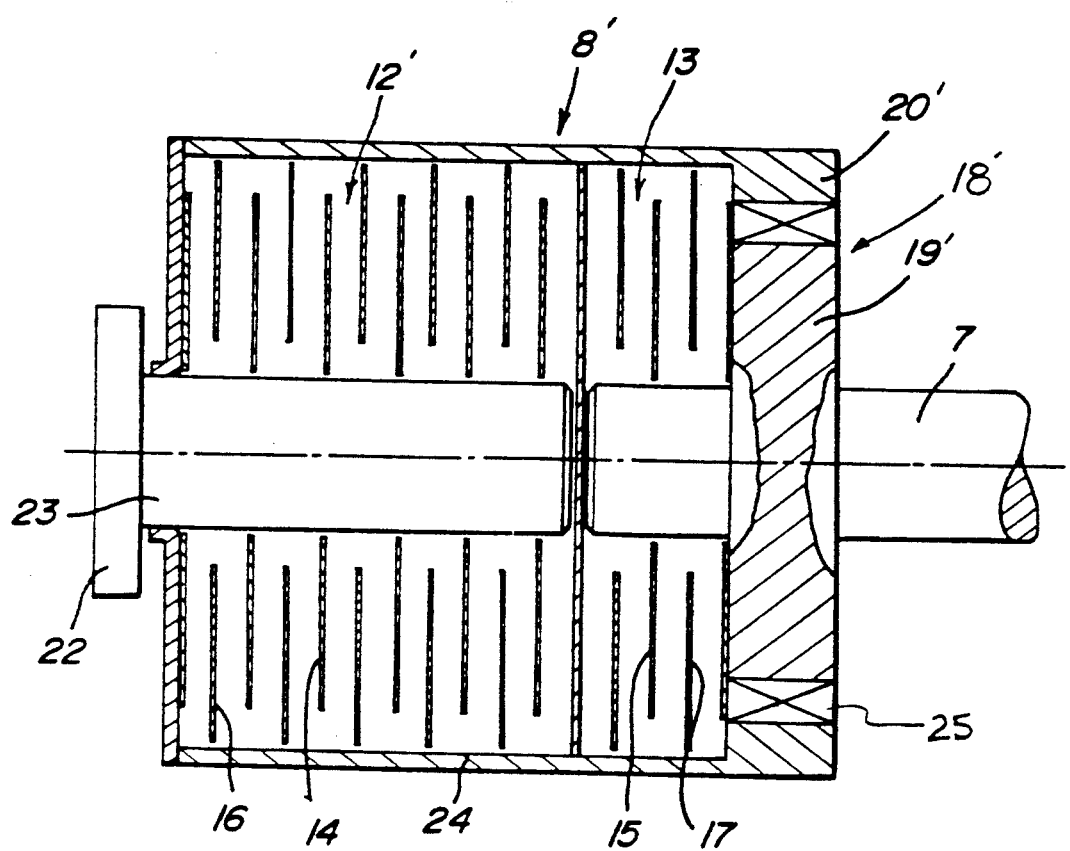
FIG. 6 is a drive assembly with a compact design.

FIG. 6 shows a compact design of the drive assembly 8' which, via a connection flange 22 and a short driveshaft 23, may be bolted to the gearbox 3 and which, at the output end, comprises a connection with the propeller shaft 7. In this case, the connecting flange 22, via the driveshaft 23, is connected to the inner plates 14 of the first viscous coupling 12', with the outer plates 16, via a housing 24, being directly connected to the outer ring 20' of the freewheeling unit 18' and the outer plate 17 of the second viscous coupling 13'. The inner ring 19' of the freewheeling unit 18' is connected to the inner plates 15 of the second viscous coupling 13' and to the propeller shaft 7. This particularly compact design means that the drive assembly only requires a smallest possible space in the vehicle.

While the invention has been illustrated and described as embodied in a drive assembly for a four wheel drive vehicle, having a disconnectable viscous coupling, it is not intended to be limited to the details shown, since various modifications and structural changes may be made without departing in any way from the spirit of the present invention, Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims:

1. A drive assembly for a four wheel vehicle, comprising:
a front axle with wheels which are driven permanently; a rear axle with wheels which are driven by a viscous coupling arranged in a longitudinal driveline; a freewheeling unit connected along the driveline in series with a viscous coupling so that during forward driving the freewheeling unit allows the rear wheels to rotate faster than the front wheels; a second viscous coupling connected along the driveline in parallel with the freewheeling unit, said second viscous coupling having a torque transmitting capacity no greater than that of the first viscous coupling; and a housing, the first and second viscous couplings, together with the freewheeling unit, being accommodated in the housing.

* * * * *